United States Patent
Rácz et al.

(10) Patent No.: US 9,549,339 B2
(45) Date of Patent: Jan. 17, 2017

(54) RADIO NETWORK NODE, NETWORK CONTROL NODE AND METHODS THEREIN

(71) Applicant: Telefonaktiebolaget LM Ericsson (publ), Stockholm (SE)

(72) Inventors: Sándor Rácz, Cegléd (HU); Szilveszter Nádas, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 597 days.

(21) Appl. No.: 13/700,905

(22) PCT Filed: Nov. 9, 2012

(86) PCT No.: PCT/SE2012/051221
§ 371 (c)(1),
(2) Date: Nov. 29, 2012

(87) PCT Pub. No.: WO2013/070165
PCT Pub. Date: May 16, 2013

(65) Prior Publication Data
US 2014/0056128 A1    Feb. 27, 2014

Related U.S. Application Data (60) Provisional application No. 61/557,468, filed on Nov. 9, 2011.

(51) Int. Cl.
*H04L 12/28* (2006.01)
*H04W 28/02* (2009.01)
*H04L 12/801* (2013.01)

(52) U.S. Cl.
CPC .......... *H04W 28/0289* (2013.01); *H04L 47/14* (2013.01); *H04W 28/0205* (2013.01)

(58) Field of Classification Search
CPC ................................................. H04W 28/0289
(Continued)

(56) References Cited

U.S. PATENT DOCUMENTS

| 2008/0186862 A1* | 8/2008 | Corbett et al. ............... 370/237 |
| 2010/0260049 A1* | 10/2010 | Racz et al. .................... 370/235 |
| 2012/0177089 A1* | 7/2012 | Pelletier ............... H04B 7/0417 |
| | | 375/219 |

FOREIGN PATENT DOCUMENTS

| EP | 2315471 A1 | 4/2011 |
| WO | 2009058085 A2 | 5/2009 |

OTHER PUBLICATIONS

3rd Generation Partnership Project. 3GPP TS 25.435 V10.2.0 (Jun. 2011). 3rd Generation Partnership Project; Technical Specification Group Radio Access Network; UTRAN Iub interface user plane protocols for Common Transport Channel data streams (Release 10). Jun. 2011, pp. 1-61.

(Continued)

*Primary Examiner* — Mark Rinehart
*Assistant Examiner* — Matthew Hopkins
(74) *Attorney, Agent, or Firm* — Patent Portfolio Builders, PLLC (57) ABSTRACT

Embodiments herein relate to a method in a radio network node (500,12,13,13) for informing a network control node (700,14) about a state of a connection between the radio network node (500,12,13,13) and a user equipment (10) served by the radio network node (500,12,13,13). The radio network node transmits to the network control node (700, 14), an indication indicating a congestion or not a congestion of MAC-hs or MAC-ehs packets towards the user equipment (10).

20 Claims, 7 Drawing Sheets

(58) Field of Classification Search
USPC .......................................................... 370/237
See application file for complete search history.

(56) References Cited

OTHER PUBLICATIONS

Palyi, P. L. et al. "Window-based HSDPA Transport Network Congestion Control." 2010 European Wireless Conference, Apr. 12-15, 2010, pp. 123-131, Lucca, Italy.

* cited by examiner

RADIO NETWORK NODE, NETWORK CONTROL NODE AND METHODS THEREIN

TECHNICAL FIELD

Embodiments herein relate to a radio network node, a network control node and methods therein. In particular, embodiments herein relate to inform the network control node about a state of a connection in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions. In e.g. High Speed Downlink Packet Access (HSDPA) systems a Radio Network Controller (RNC) may control the radio base stations.

Recently, Multiflow transmission was proposed in 3rd Generation Partnership Project (3GPP) for HSDPA. For multiflow transmission when connections to the user equipment are via different RBSs, the flow has to be split in the RNC. The connections may be referred to as 'legs'. When HSDPA Flow Control is used in a traditional way the Capacity Allocation Control Frames (CA CF) define sending speed for both legs, which solves distribution of packets or Packet Data Units (PDU) among different legs. As HSDPA Flow Control is a proprietary solution and there may be other solutions, which do not only rely on credits indicated in High Speed-Downlink Shared Channel (HS-DSCH) CA CF. E.g. Active Queue Management (AQM) based congestion control solves flow control by propagating Iub interface or Medium Access Control-high speed (MAC-hs) or Medium Access Control-enhanced high speed (MAC-ehs) loss to end-user Transport Control Protocol (TCP). The main idea of an AQM based flow control is that the application level TCP is reused as congestion control solution. When congestion is detected then the application level TCP is informed by an Internet Protocol (IP) packet drop. This packet drop will be noticed by TCP and the TCP will react on this loss with rate reduction. The Iub interface connects the RBS and the RNC. The CA CF may include two Congestion Status Bits, however the values of these Congestion Status bits only indicate Transport Network Layer (TNL) congestion to be taken into account when distributing data to a user equipment still leading to a non-optimal packet distribution.

SUMMARY

An object according to some embodiments herein is for enabling improved data distribution in a radio communications network in an efficient manner.

According to an aspect of embodiments herein, the object is achieved by a method in a radio network node for informing a network control node about a state of a connection between the radio network node and a user equipment served by the radio network node. The radio network node transmits to the network control node, an indication indicating a congestion or not a congestion of MAC-hs or MAC-ehs packets towards the user equipment.

According to another aspect of embodiments herein, the object is achieved by a method in a network control node for distributing a data packet towards a user equipment via a first radio network node or a second network node. The network control node receives an indication indicating a congestion or not a congestion of MAC-hs or MAC-ehs packets at the first radio network node or the second radio network node. The network control node distributes the data packet to the first radio network node or the second radio network node taking into account the received indication.

According to yet another aspect of embodiments herein, the object is achieved by a radio network node for informing a network control node about a state of a connection between the radio network node and a user equipment served by the radio network node. The radio network node comprises a transmitting circuit configured to transmit to the network control node, an indication indicating a congestion or not a congestion of MAC-hs or MAC-ehs packets towards the user equipment.

According to still another aspect of embodiments herein, the object is achieved by a network control node for distributing a data packet towards a user equipment via a first radio network node or a second network node. The network control node comprises a receiving circuit configured to receive an indication indicating a congestion or not a congestion of MAC-hs or MAC-ehs packets at the first radio network node or the second radio network node. The network control node comprises a scheduler configured to distribute the data packet to the first radio network node or the second radio network node taking into account the received indication.

Embodiments herein indicate congestion of MAC-hs or MAC-ehs packets towards the user equipment explicitly to the network control node. This has the advantage that it enables improved data distribution in the radio communications network in an efficient manner. E.g. is a connection to the user equipment via one of the radio network node congested of MAC-hs or MAC-ehs packets then less data packets are transmitted over that connection.

BRIEF DESCRIPTION OF THE DRAWINGS

Embodiments will now be described in more detail in relation to the enclosed drawings, in which.

DETAILED DESCRIPTION

Figure 1:
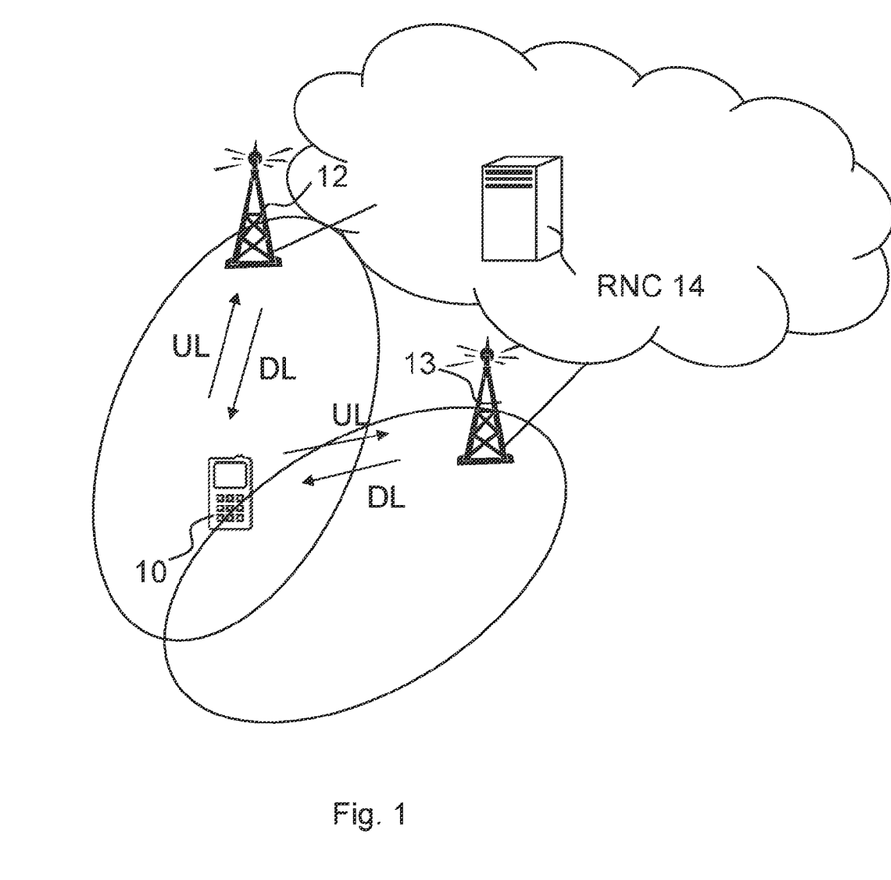
FIG. 1 is a schematic overview depicting a radio communications network according to embodiments herein.

FIG. 1 is a schematic overview depicting a radio communications network 1 according to some embodiments herein. The radio communications network 1 may be a Wideband Code Division Multiple Access (WCDMA) network or a Global System for Mobile communications/Enhanced Data rate for GSM Evolution (GSM/EDGE) network just to mention a few possible implementations. The radio communications network 1 comprises a radio network node, a first radio network node referred herein as a first radio base station 12, providing radio coverage over at least one geographical area forming a cell. The cell definition may also incorporate frequency bands used for transmissions, which means that two different cells may cover the same geographical area but using different frequency bands. A user equipment 10 is served in the cell by the first radio base station 12 and is communicating with the first radio base station 12. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within the cell. The user equipment 10 transmits data over an air or radio interface to the first radio base station 12 in uplink (UL) transmissions and the first radio base station 12 transmits data over an air or radio interface to the user equipment 10 in downlink (DL) transmissions. Furthermore, the first radio base station 12 is controlled by a network control node exemplified as an RNC 14 in FIG. 1. The RNC 14 further controls a second radio network node referred herein as a second radio base station 13. The user equipment 10 is also connected to the second radio base station 13. The user equipment 10 receives data packets from the RNC via the first radio base station 12 and via the second radio base station 13 in a so called multiflow transmission procedure. The respective radio network node, above referred to as radio base stations 12,13, may also be referred to as e.g. a NodeB, an evolved Node B (eNB, eNode B), a base transceiver station, Access Point, Base Station, base station router, or any other network unit capable to communicate with a user equipment within the cells served by the respective radio base station 12,13 depending e.g. of the radio access technology and terminology used. The radio communications network 1 may be any cellular radio network comprising an RNC capable of establishing and routing a data packet session through different network transmission paths exploiting different routing protocols, the radio communications network may e.g. be a Universal Terrestrial Radio Access Network (UTRAN)-General Packet Radio Service (GPRS) network, a WCDMA network, a CDMA 2000 network, an IS-95 network, a Digital-Advanced Mobile Phone Service (D-AMPS) network etc. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network.

In a Radio Access Network (RAN) of the radio communications network 1, the congestion may occur (i) over the Transport Network (TN) that connects the RNC 14 and respective radio base station, or (ii) in the first radio base station 12 or the second radio base station 13 when a capacity of a Uu interface towards the user equipment 10 is smaller than the incoming bitrate to the first radio base station 12 or the second radio base station 13, in this case the length of MAC-hs packets or MAC-ehs packets in a queue is starting to increase. A MAC-hs layer or MAC-ehs layer is located in the respective radio base station and is responsible e.g. for scheduling, priority handling, Hybrid Automatic Repeat Request (HARQ), and selection of transport format and resources. An MAC-hs entity or MAC-ehs entity at respective radio base station 12,13 transfers MAC-hs or MAC-ehs packets, also referred to as MAC-hs or MAC-ehs PDUs, to the user equipment 10. According to embodiments herein the first radio base station 12 may detect or determine that MAC-hs or MAC-ehs packets are congested over the connection towards the user equipment 10. The first radio base station 12 then indicates to the RNC 14 whether MAC-hs or MAC-ehs congestion has been detected or not. The second radio base station 13 may also indicate whether MAC-hs or MAC-ehs congestion has been detected or not to the RNC 14. The RNC 14 may then, based on the received indication or indications, determine transmitting packets to the user equipment 10 via the first radio base station 12 or the second radio base station 13. E.g. the RNC 14 may distribute the packets among the two radio base stations 12,13 according to a packet distribution algorithm based on the received indication or indications. Thus, congestion information e.g. TN congestion information and MAC-hs congestion information for both legs, may be used in the packet distribution algorithm. For example, if one leg, i.e. one connection to the user equipment 10 over one of the radio base stations 12,13, is congested then less packet are transmitted over that leg. Congested may be indicated by queue length of MAC-hs or MAC-ehs packets. Thus, the connection associated with shortest queue length may be prioritized when distributing packets to the user equipment 10. The congestion information of the MAC-hs or MAC-ehs layer is important input for the packet distribution algorithm in the RNC 14. Thus, the RNC 14 distributes data packets among controlled radio network nodes, such as the first radio base station 12 and the second radio base station 13, based on received indication or indications of MAC-hs or MAC-ehs congestion from respective radio network node. In some embodiments, more details about the nature of the congestion may further be sent to the network control node.

Figure 2:
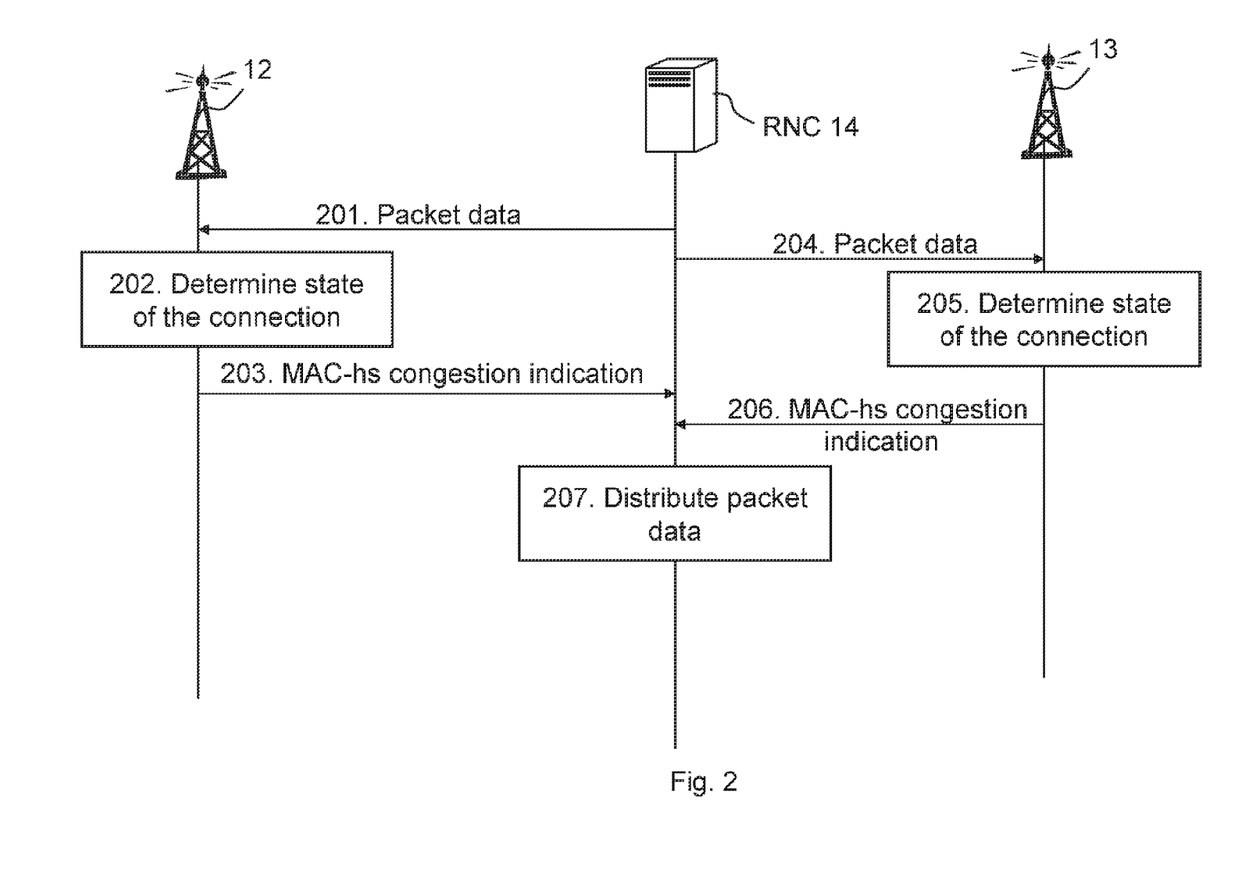
FIG. 2 is a combined schematic flowchart and signaling scheme according to embodiments herein.

FIG. 2 is a schematic combined flowchart and signaling scheme according to some embodiments in the radio communications network 1. The actions or steps may be performed in any suitable order. The RNC 14 distributes data packets to the user equipment 10 via the first radio base station 12 and via the second radio base station 13. E.g. initially data packets are equally distributed to the user equipment 10 via the different connections.

Action 201. The RNC 14 sends data packets to the first radio base station 12 to distribute to user equipments, e.g. the user equipment 10, within the cell served by the first radio base station 12.

Action 202. The first radio base station 12 may determine or detect whether a connection to the user equipment 10 is congested of MAC-hs protocol transmissions, i.e. MAC-hs packets. E.g. if MAC-hs packets, also referred to as MAC-hs protocol packets or MAC-hs protocol layer packets, are queued over a certain threshold level or a delay of transmitting HARQ messages is over a certain threshold a congestion is detected. A queue may be measured by a number of PDUs of the Mac-hs protocol layer or time in queue of PDUs. Such PDUs comprise e.g. user traffic such as TCP data and TCP Acknowledgements (ACK). The MAC-hs queue may be per Radio Bearer and a MAC-hs radio bearer may be associated with one user equipment e.g. the user equipment 10. It should be noted that the user equipment 10 may have more than one radio bearer carrying data.

Action 203. The first radio base station 12 transmits to the RNC 14, an indication indicating a congestion or not a congestion of MAC-hs packets towards the user equipment 10. The indication thus indicates whether the connection to the user equipment 10 is MAC-hs packets congested or not. The indication may be transmitted in the HS-DSCH Capacity Allocation Control Frame (CA CF). Furthermore, the indication may further also indicate whether congestion over the transport network is present.

Action 204. Additionally or alternatively, the RNC 14 sends data packets to the second radio base station 13 to distribute to user equipments, e.g. the user equipment 10, within the cell served by the second radio base station 13.

Action 205. The second radio base station 13 detects whether a connection to the user equipment 10 is congested of MAC-hs layer transmissions towards the user equipment 10. E.g. if MAC-hs protocol packets are queued over a certain threshold level or a delay of transmitting HARQ messages is over a certain threshold a congestion is determined.

Action 206. The second radio base station 13 transmits an indication indicating whether connection is MAC-hs protocol congested or not. The indication may be transmitted in the HS-DSCH CA CF.

Action 207. The RNC 14 may then distribute data packets or PDUs taking the received indications from respective radio base station 12,13 into account. Thus, the RNC 14 receives data packets and the RNC 14 decides e.g. what leg, meaning connection to the user equipment 10 via either the first or the second radio base station 12,13, is used for what data packets. For example, in a static solution half of the data packets are transmitted over the first base-station 12 and another half over the second radio base-station 13. Of course both radio base-stations 12,13 will transmit these data packets to the same user equipment 10. However, if the RNC 14 has some information about congestion status of MAC-hs packets of the used legs then instead of e.g. the 50-50% division it may use a more efficient solution, e.g. less packets are transmitted over a congested leg. It should be noted that MAC-hs packets are used in this illustrative example but MAC-ehs packets may alternatively be used in similar embodiments.

As stated above, the indication may be transmitted in the HS-DSCH CA CF. Section "6.3.3.11 HS-DSCH CAPACITY ALLOCATION" in 3GPP TS 25.435 V10.2.0 (2011-06) describes the CA CF. Two types of HS-DSCH CAPACITY ALLOCATION exist for the HS-DSCH capacity allocation, i.e. HS-DSCH CAPACITY ALLOCATION TYPE 1 Control Frame and HS-DSCH CAPACITY ALLOCATION TYPE 2 Control Frame.

| CAPACITY ALLOCATION TYPE 1 payload structure |
|---|
| 7 ... 0 |
| Spare bits 7-6    Congestion Status    CmCH-PI |
| Maximum MAC-d PDU Length |
| Maximum MAC-d PDU Length (cont)    HS-DSCH Credits |
| HS-DSCH Credits (cont) |
| HS-DSCH Interval |
| HS-DSCH Repetition Period |
| Spare Extension |

The CAPACITY ALLOCATION TYPE 1 Control Frame describes an allocation that the RNC 14, also referred to as a Controlling RNC CRNC, may use. Each octet of bits comprises 8 bits that are indexed from 7-0. When the High Speed-Downlink Shared Channel (HS-DSCH) Credits Information Element (IE) has a value of 0, it signifies that there is no resources allocated for transmission and to thus stop transmission. When the HS-DSCH Credits IE has a value of 2047, it signifies unlimited capacity for transmission of PDUs. When the HS-DSCH Repetition Period IE has a value of 0, it signifies that the allocation, Maximum MAC-d PDU Length, HS-DSCH Credits and HS-DSCH Interval IEs, may be repeated without limit. In addition to this the CAPACITY ALLOCATION TYPE 1 Control Frame informs the RNC 14 about the detection of congestion in the DL transport network layer with Congestion Status Bits. Common Transport Channel Priority Indicator (CmCH-PI) is a relative priority of the data frame and SDUs therein included.

| CAPACITY ALLOCATION TYPE 2 payload structure |
|---|
| 7 ... 0 |
| Spare bits 7-6    Congestion Status    CmCH-PI |
| Spare bits 7-3    Max. MAC-d/c PDU Length |
| Maximum MAC-d/c PDU Length (cont) |
| HS-DSCH Credits |
| HS-DSCH Credits (cont) |
| HS-DSCH Interval |
| HS-DSCH Repetition Period |
| Spare Extension |

The CAPACITY ALLOCATION TYPE 2 Control Frame describes an allocation that the RNC 14 may use. Each octet of bits comprises 8 bits that are indexed from 7-0. When the HS-DSCH Credits IE has a value of 0 it signifies that there is no resources allocated for transmission and to thus stop transmission. When the HS-DSCH Credits IE has a value of 65535, it signifies unlimited capacity for transmission of PDUs. When the HS-DSCH Repetition Period IE has a value of 0, it signifies that the allocation (Maximum MAC-d/c PDU Length, HS-DSCH Credits and HS-DSCH Interval IEs) may be repeated without limit. In addition to this the CAPACITY ALLOCATION TYPE 2 Control Frame informs the RNC 14 about the detection of congestion in the DL transport network layer with the Congestion Status Bits. CmCH-PI is the relative priority of the data frame and SDUs therein included.

Maximum MAC-d PDU Length IE is used in HS-DSCH CAPACITY ALLOCATION TYPE 1 Control Frame. The value indicates the maximum allowable PDU size among the MAC-d PDU sizes configured via Node B Application Part (NBAP), which is a signalling protocol responsible for the control of the Node B by the RNC 14.

HS-DSCH Credits IE is used in HS-DSCH CAPACITY ALLOCATION (TYPE 1 and TYPE 2) Control Frame. It indicates the granted amount of MAC-d PDU data that the RNC 14 may transmit during one HD-DSCH interval. In case of HS-DSCH CAPACITY ALLOCATION TYPE 1 Control Frame, it indicates the number of MAC-d PDUs that a RNC 14 may transmit during one HS-DSCH Interval granted in the HS-DSCH CAPACITY ALLOCATION TYPE 1 Control Frame. In case of HS-DSCH CAPACITY ALLOCATION TYPE 2 Control Frame, the granted amount of MAC-d [Frequency Division Duplexing (FDD) and 1.28 Mcps Time Division Duplexing (TDD)—or MAC-c] PDU data in octets is obtained by multiplying the MAC-d PDU length [FDD and 1.28 Mcps TDD- or the MAC-c PDU length], indicated by the Maximum MAC-d/c PDU Length IE, with the number of MAC-d PDUs [FDD and 1.28 Mcps TDD- or MAC-c PDUs], indicated by the HS-DSCH Credits IE.

Value Range: {0-2047, where 0=stop transmission, 2047=unlimited} in case of HS-DSCH CAPACITY ALLOCATION TYPE 1 Control Frame, {0-65535, where 0=stop transmission, 65535=unlimited} in case of HS-DSCH CAPACITY ALLOCATION TYPE 2 Control Frame.

Field Length: 11 bits in case of HS-DSCH CAPACITY ALLOCATION TYPE 1 Control Frame, 16 bits in case of HS-DSCH CAPACITY ALLOCATION TYPE 2 Control Frame.

HS-DSCH Interval; the value of this field indicates the time interval during which the HS-DSCH Credits granted in the HS-DSCH CAPACITY ALLOCATION (TYPE 1 or TYPE 2) Control Frame may be used. The first interval starts immediately after reception of the HS-DSCH CAPACITY ALLOCATION (TYPE 1 or TYPE 2) Control Frame, subsequent intervals start immediately after the previous interval has elapsed. This value is only applied to the HS-DSCH transport channel.

Value Range: {0-2550 ms}. Value 0 shall be interpreted that none of the credits shall be used.

Granularity: 10 ms.

Field Length: 8 bits.

HS-DSCH Repetition Period; the value of this field indicates the number of subsequent intervals that the HS-DSCH Credits IE granted in the HS-DSCH CAPACITY ALLOCATION (TYPE 1 or TYPE 2) Control Frame may be used. These values represent an integer number of Intervals. This field is only applied to the HS-DSCH transport channel.

Value Range: {0-255, where 0=unlimited repetition period}.

Field Length: 8 bits.

Spare Extension. Bits spared to define an extension of an IE or a new IE.

The Congestion Status Bits are used by the first radio base station 12 to indicate whether a congestion situation is detected in a DL transport network layer or not. The first radio base station 12 provides the congestion status in every HS-DSCH CAPACITY ALLOCATION (TYPE 1 or TYPE 2) Control Frame, which the RNC 14 may use.

| Value range: | |
|---|---|
| 0 | No TNL Congestion |
| 1 | Reserved for future use |
| 2 | TNL Congestion - detected by delay build-up |
| 3 | TNL Congestion - detected by frame loss |

Field Length: 2 bits.

The Maximum MAC-d/c PDU Length IE is used in HS-DSCH CAPACITY ALLOCATION TYPE 2 Control Frame. The value is a factor in the granted amount of MAC-d PDU data that the RNC 14 may transmit during one HS-DSCH Interval. The amount of MAC-d [FDD and 1.28 Mcps TDD- or MAC-c] PDU data in octets is obtained by multiplying the MAC-d [FDD and 1.28 Mcps TDD- or MAC-c] PDU length, indicated by the Maximum MAC d/c PDU Length IE, with the number of MAC-d PDUs [FDD and 1.28 Mcps TDD- or MAC-c PDUs], indicated by the HS-DSCH Credits IE.

Value Range: {0-1505}, 0—not used.

Field Length: 11 bits.

Embodiments herein provide following solutions to indicate MAC-hs congestion:
  Use Congestion status value 1, reserved for future use, to indicate MAC-hs congestion.
  Introduce a 2-bit "MAC-hs congestion status"
    A value (0) for no MAC-hs congestion, a different value (1) for MAC-hs congestion
    A value (0) for no MAC-hs congestion, a different value (1) for MAC-hs congestion due to buffer buildup, a different value for frame drop (2)
  Rely on the information about MAC-hs queue length and MAC-hs queue delay to determine MAC-hs congestion.

As "Congestion status value 1" may be needed for different type of TNL congestion and as TNL and MAC-hs congestion may in theory happen at the same time, using Use Congestion status value 1 is not recommended as that would omit the possibility to indicate both TNL and MAC-hs congestion.

MAC-hs Congestion Details Indication

For some PDU distribution algorithms it may be advantageous to have detailed information about the status of the MAC-hs scheduling buffer. The following information is possible. The fields, described below, may be added to the spare extension part of the CA CF, and might not be sent in every CA CF. These fields may indicate an instantaneous value or an averaged value. The condition when to send this information may vary between different vendors.

In some embodiments the indication comprises MAC-hs queue length. Description: The length of the MAC-hs queue in octets. Value range: 3*8 bits (determined based on max. SDU size=1500 octets and max RLC window).

In some embodiments the indication comprises MAC-hs queue delay. Description: The delay experienced by the most delayed PDU in the queue (normally the first). Value Range: 0-500 ms, (9 bits needed for 1 ms granularity, 8 bits are OK for 2 ms granularity)

TNL Congestion Details Indication

In IP based TN, Explicit Congestion Notification (ECN) may also be used for congestion detection. While congestion status value '2', which defines "TNL congestion—detected by delay build-up", may be used to indicate congestion detected by ECN, it may be advantageous to differentiate ECN type of congestion. A solution for that is to use congestion Status 1 to indicate "TNL Congestion—detected by ECN".

In 3GPP TS 25.435 V10.2.0 (2011-06) HS-DSCH DATA FRAME type 1 and 2 "HS-DSCH Channels" includes Delay Reference Time (DRT). If DRT is included often enough, maybe in each HS-DSCH DATA FRAME from the RNC 14 to the first radio base station 12, then the dynamic delay over a Iub may be measured at the first radio base station 12 and used for PDU distribution in RNC 14. The DRT may be used to estimate the actual TN delay; e.g. packet delay between RNC 14 and the first radio base station 12. In the RNC 14 we add time-stamps to the packets, based on these time-stamps the first radio base station 12 may estimate the delay of the packet. When DRT is used then the first radio base station 12 may provide a bit detailed information about the TN congestion status.

The following optional data frame field is proposed to be introduced.

'Iub dynamic delay'. Description: The delay experienced by HS-DSCH DATA FRAME in TNL. Value Range: 0-500 ms, (9 bits needed for 1 ms granularity, 8 bits are OK for 2 ms granularity)

Indication Whether an Optional Field is Present

A bitmask may be introduced in the spare extension part of CA CF to indicate whether the given information is present for the following fields: MAC-hs queue length; MAC-hs queue delay; and/or Iub dynamic delay.

Thus, embodiments above describe different ways of indicating, to the RNC 14, the congestion of MAC-hs packets towards the user equipment 10, but also TN congestion.

Figure 3:
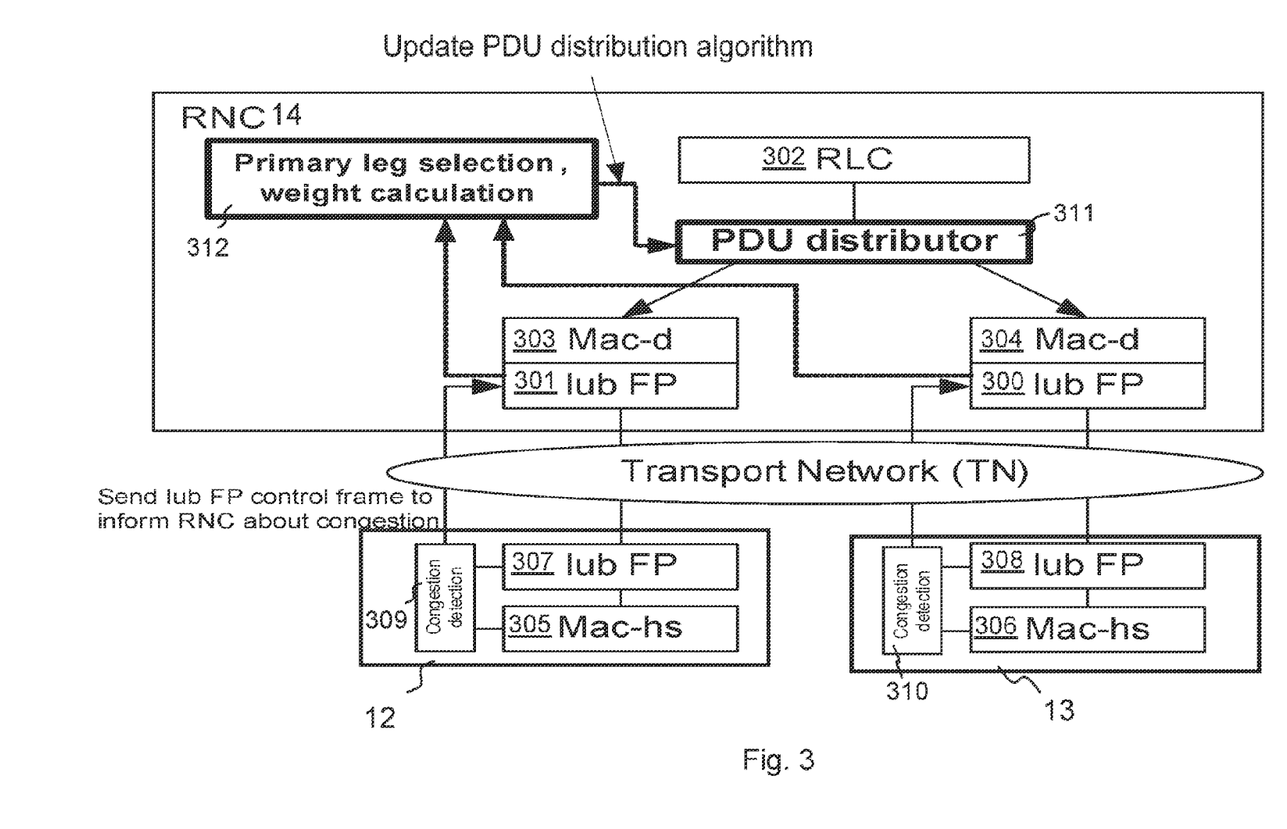
FIG. 3 is a block diagram depicting embodiments herein.

FIG. 3 is a block diagram depicting embodiments herein. An HSDPA architecture splits a MAC layer between the RNC 14 and the radio network node e.g. the first radio base station 12. MAC PDUs that are generated by the RNC 14 and referred to as MAC-d PDUs, are aggregated and sent to the radio network node over a Iub interface using HS-DSCH frames; Iub Frame Protocol (FP) 300,301. A Radio Link Control (RLC) layer 302 at the RNC 14 is segmenting and responsible for retransmissions of user data and control data on the downlink. The RLC layer 302 is involved in a data link layer retransmission process when the HARQ fails or exceeds number of retransmissions. A MAC-d layer entity 303, 304 is comprised in the RNC 14 to handle transport channel switching. A MAC-hs layer entity 305 is located in the first radio base station 12 and a MAC-hs layer entity 306 is located in the second radio base station 13. The MAC-hs entity 305,306 is responsible for scheduling, priority handling, HARQ, and selection of an appropriate transport format and resources. For an HSDPA connection, data received from a core network is encapsulated in a MAC-d PDU and then transmitted over the Iub interface in an HS-DSCH frame format to Iub FP 307,308. The MAC-hs entity 305,306 in the first or second radio base station 12,13 transfers the MAC-hs PDUs to the user equipment 10, That is, the PDUs of the Mac-hs protocol layer. This comprises the user traffic, e.g. TCP data and TCP Acknowledgements (ACKs).

In the radio network nodes 12, 13 the congestion status is evaluated in congestion detection entities 309,310. When congestion is detected, then by using Iub FP Control Frame this congestion information is signalled backed to RNC 14. Based on this information a PDU distributor 311, referred to below as a scheduler, updates its status. For example, if the first radio base station 12 signals back MAC-hs congestion then less data packets will be transmitted over the first radio base station 12 towards the user equipment 10. For example there are two legs and a Weight_first=10% is used in the RNC 14 when MAC-hs congestion is reported from the first radio base station 12. Then 90% of the RLC PDUs are transmitted over a secondary leg to the second radio base station 13 and the remaining 10% over the first leg to the first radio base station 12. An algorithm 312 takes indication of MAC-hs congestion into account when performing primary leg selection, and weight calculation, which is used to update PDU distribution algorithm. As stated above it should be noted that MAC-hs packets are used in this illustrative example but MAC-ehs packets may alternatively be used in similar embodiments.

The object of distributing data packets in an efficient manner may be achieved according to embodiments herein by a method in a radio network node, such as the first radio base station 12, for informing the network control node, such as the RNC 14, about a state of a connection between the first radio base station 12 and the user equipment 10 served by the first radio base station 12. The first radio base station 12 may determine whether a congestion over an air interface towards the user equipment 10 exists. For example, MAC-hs protocol layer packets congesting a radio bearer towards the user equipment 10. The first radio base station 12 then transmits to the RNC 14 an indication indicating that a congestion is determined or not. Some embodiments herein include a possibility to indicate MAC-hs congestion in e.g. the CA CF. Optionally also indicate MAC-hs queue length and MAC-hs queue delay in the CA CF. Optionally the first radio base station 12 may also indicate Iub Frame Protocol (FP) Data Frame Dynamic Delay in the CA CF. The extra indicated congestion information may be utilized in a data packet or PDU distribution algorithm such as a weight distribution algorithm in the RNC 14. Thus, an addition of a congestion indication in the CA CF is available and more information is available for the purposes of packet or PDU distribution. In the current solution only the Transport Network (TN) congestion can be signaled back to the RNC 14. Embodiments herein signal back Mac-hs related congestion, when e.g. the Mac-hs queue is getting too long.

According to embodiments herein the object may further be achieved by a method in a network control node such as the RNC 14 for distributing data packets in a radio communications network. The RNC 14 receives an indication from e.g. the first radio base station 12 indicating a congestion or not a congestion of packets, such as MAC-hs packets, over an air interface towards the user equipment 10 served by the radio network node. The RNC 14 controls at least the radio network node and another radio network node, e.g. the first and second radio base station 12,13, and transmits packets to the user equipment 10 via the respective radio network node in a multi flow manner. The RNC 14 decides scheduling data packets towards the user equipment 10 via the radio network node and/or the other radio network node based on the received indication. For example, the RNC 14 takes the indication into account when selecting transmission path to the user equipment 10 for data packets.

Figure 4:
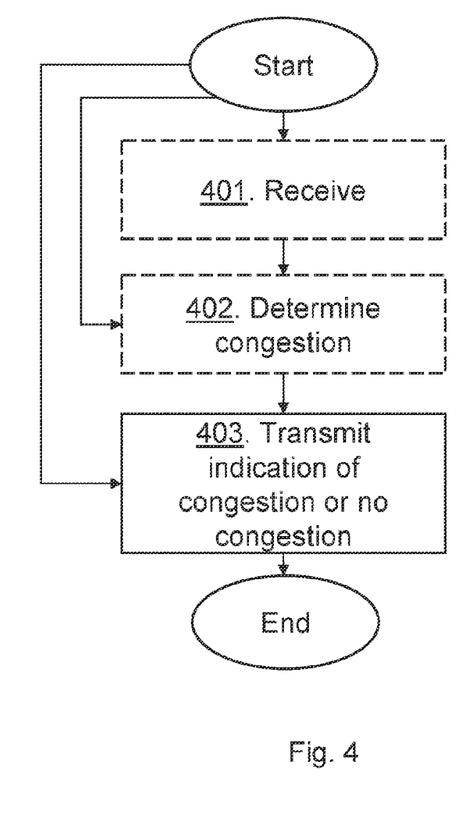
FIG. 4 is a schematic flowchart of a method in a radio network node according to embodiments herein.

The method actions in the radio network node, referred to as the first radio base station 12 or the second radio base station 13 in the figures, for informing the network control node, such as the RNC 14, about the state of a connection between the radio network node and the user equipment 10 served by the radio network node according to some general embodiments will now be described with reference to a flowchart depicted in FIG. 4. The actions do not have to be taken in the order stated below, but may be taken in any suitable order. Actions performed in some embodiments are marked with dashed boxes.

Action 401. The radio network node may receive data packets to distribute to the user equipment 10 within the cell served by the radio network node.

Action 402. The radio network node may determine whether a congestion over a radio interface towards the user equipment 10 exists or not. The congestion may be determined when MAC-hs or MAC-ehs packets congests a radio bearer towards the user equipment 10. In some embodiments the radio network node determines whether MAC-hs or MAC-ehs packets are queued over a first threshold or a delay of transmitting HARQ messages is over a second threshold. In some embodiments the radio network node may determine that the transport network between the radio network node and the network control node is congested based on received Delay Reference Time from the network control node.

Action 403. The radio network node transmits to the network control node, an indication indicating a congestion or not a congestion of MAC-hs or MAC-ehs packets towards the user equipment 10. The indication may further indicate a delay over the Iub interface. The indication may comprise a bit indicating congestion of MAC-hs or MAC-ehs packets. The indication may comprise a first value indicating no congestion of MAC-hs or MAC-ehs packets or a second value indicating congestion of MAC-hs or MAC-ehs packets. The indication may additionally or alternatively comprise a value indicating congestion of MAC-hs or MAC-ehs packets due to a build-up buffer or a different value indicating congestion of MAC-hs or MAC-ehs packets due to frame drop. The indication may be comprised in a CA CF. For example; the indication may be comprised in a spare extension field in the CA CF. In some embodiments the radio network node transmits queue length of MAC-hs or MAC-ehs packets and/or queue delay of MAC-hs or MAC-ehs packets. Thus, the indication may comprise the queue length or the queue length. The radio network node may transmit an additional indication indicating that a transport network between the radio network node and the network control node is congested, such as the delay over the Iub interface.

Figure 5:
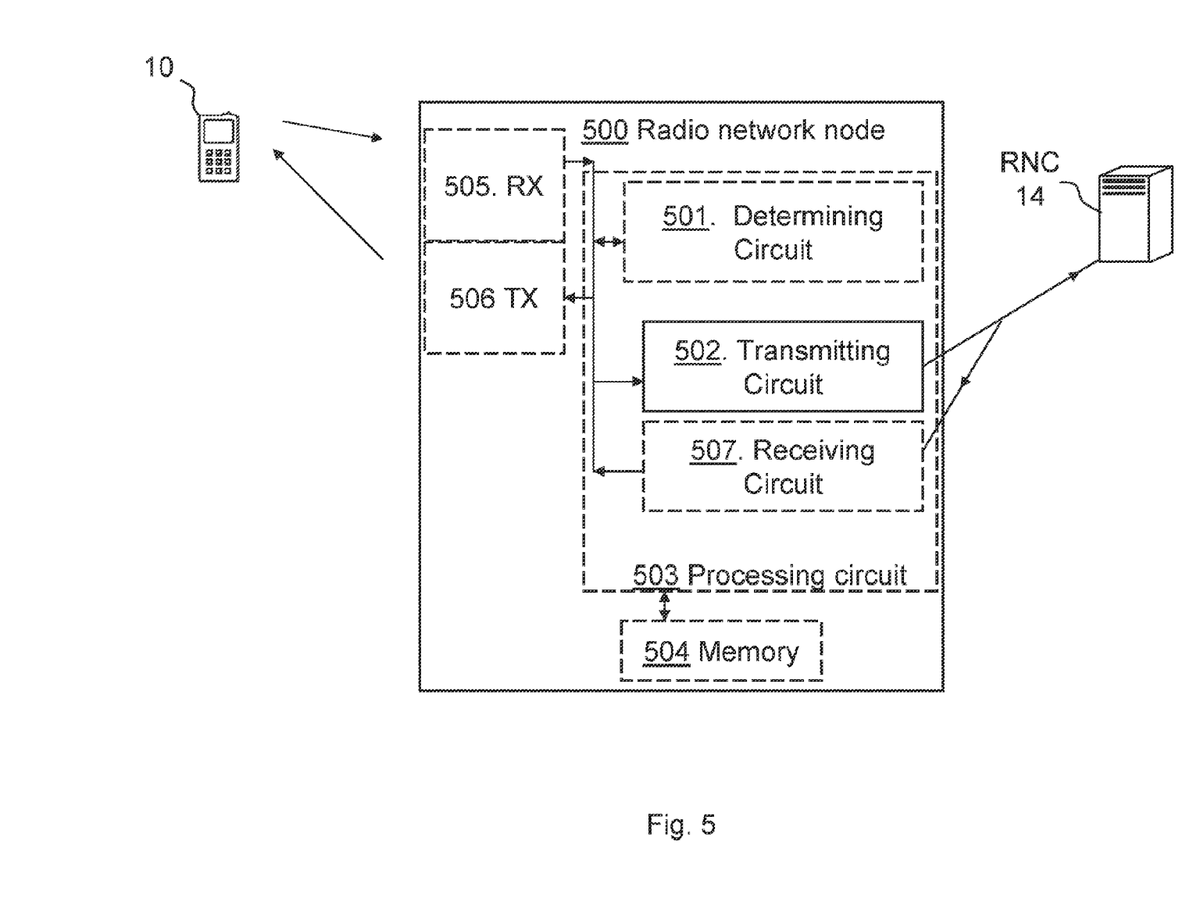
FIG. 5 is a block diagram depicting embodiments of a radio network node.

FIG. 5 is block diagram depicting a radio network node 500, exemplified above as the first radio base station 12 or the second radio base station 13, for informing the network control node, such as the RNC 14, about the state of the connection between the radio network node 500 and the user equipment 10 served by the radio network node 500. Thus, the radio network node 500 is suitable for transmitting congestion information to the network control node. Circuits and units marked with dashed lines are comprised in some of the embodiments of the radio network node 500.

The radio network node 500 may comprise a determining circuit 501 configured to determine whether a congestion over the radio interface towards the user equipment 10 exists or not. The congestion is determined when MAC-hs or MAC-ehs packets congests a radio bearer towards the user equipment 10. The determining circuit 501 may be configured to determine whether MAC-hs or MAC-ehs packets are queued over a first threshold or a delay of transmitting HARQ messages is over a second threshold. The determining circuit 501 may further be configured to determine that the transport network between the radio network node 500 and the network control node is congested based on received Delay Reference Time from the network control node.

Furthermore, the radio network node 500 comprises a transmitting circuit 502 configured to transmit to the network control node, an indication indicating a congestion or not a congestion of MAC-hs or MAC-ehs packets towards the user equipment 10, or that the connection is congested or not to the network control node. The indication may further indicate a delay over the Iub interface. The indication may comprise a bit indicating congestion of MAC-hs or MAC-ehs packets. The indication may comprise the first value indicating no congestion of MAC-hs or MAC-ehs packets or the second value indicating congestion of MAC-hs or MAC-ehs packets. The indication may comprise a value indicating congestion of MAC-hs or MAC-ehs packets due to a build-up buffer or a different value indicating congestion of MAC-hs or MAC-ehs packets due to frame drop. The indication may be comprised in a CA CF. The indication may be comprised in a spare extension field in the CA CF. The transmitting circuit 502 may be configured to transmit queue length of MAC-hs or MAC-ehs packets and/or queue delay of MAC-hs or MAC-ehs packets. Alternatively or additionally, the transmitting circuit 502 may further be configured to transmit an additional indication indicating that the transport network between the radio network node 500 and the network control node is congested.

The embodiments herein for informing connection state to the network control node may be implemented through one or more processors, such as a processing circuit 503 in the radio network node 500 depicted in FIG. 5, together with computer program code for performing the functions and/or method actions of the embodiments herein. The program code mentioned above may also be provided as a computer program product, for instance in the form of a data carrier carrying computer program code for performing embodiments herein when being loaded into the radio network node. One such carrier may be in the form of a CD ROM disc. It is however feasible with other data carriers such as a memory stick. The computer program code may furthermore be provided as pure program code on a server and downloaded to the radio network node 500. The radio network node 500 further comprises a memory 504 that may comprise one or more memory units and may be used to store for example data such as packets, congestion information, applications to perform the methods herein when being executed on the network control node 500 or similar.

Additionally, the radio network node 500 further comprises a receiver 505 that may be configured to receive transmissions from the user equipment 10 and a transmitter 506 configured to transmit data to the user equipment 10. The data packets from the network control node may be received at a receiving circuit 507 comprised in the radio network node 500.

Figure 6:
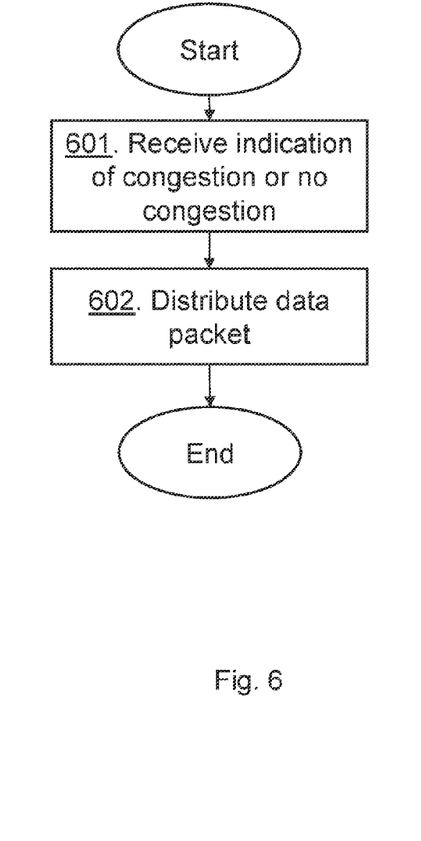
FIG. 6 is a schematic flowchart of a method in a network control node according to embodiments herein.

The method actions in the network control node, referred to as the RNC 14 in the figures, for distributing a data packet towards the user equipment 10 via a first radio network node, such as the first radio base station 12, or a second network node, such as the second radio base station 13, according to some general embodiments will now be described with reference to a flowchart depicted in FIG. 6. The actions do not have to be taken in the order stated below, but may be taken in any suitable order.

Action 601. The network control node receives an indication indicating a congestion or not a congestion of MAC-hs or MAC-ehs packets at the first radio network node or the second radio network node. The indication may comprise a bit indicating congestion or not of MAC-hs or MAC-ehs packets. The indication may comprise a first value indicating no congestion of MAC-hs or MAC-ehs packets or a second value indicating congestion of MAC-hs or MAC-ehs packets. The indication may comprise a value indicating congestion of MAC-hs or MAC-ehs packets due to build-up buffer or a different value indicating congestion of MAC-hs or MAC-ehs packets due to frame drop. The indication may further indicate a delay over the Iub interface. The delay over the Iub interface may be defined as an explicit value or a value indicating different types of congestions. The indication may be comprised in a CA CF. The indication may for example be comprised in a spare extension field in the CA CF. The network control node may receive information of queue length of MAC-hs or MAC-ehs packets and/or queue delay of MAC-hs or MAC-ehs packets at the first radio network node or the second radio network node. In some embodiments the network control node receives an additional indication indicating that the transport network between the first or the second radio network node and the network control node is congested or a delay over the Iub interface. The additional indication may indicate a delay over the Iub interface.

Action 602. The network control node distributes the data packet to the first radio network node or the second radio network node taking into account the received indication. The network control node may take the additional indication into account when distributing the data packets. The network control node may distribute data packets according to a weight distribution algorithm taking the indication and/or the additional indication into account.

Figure 7:
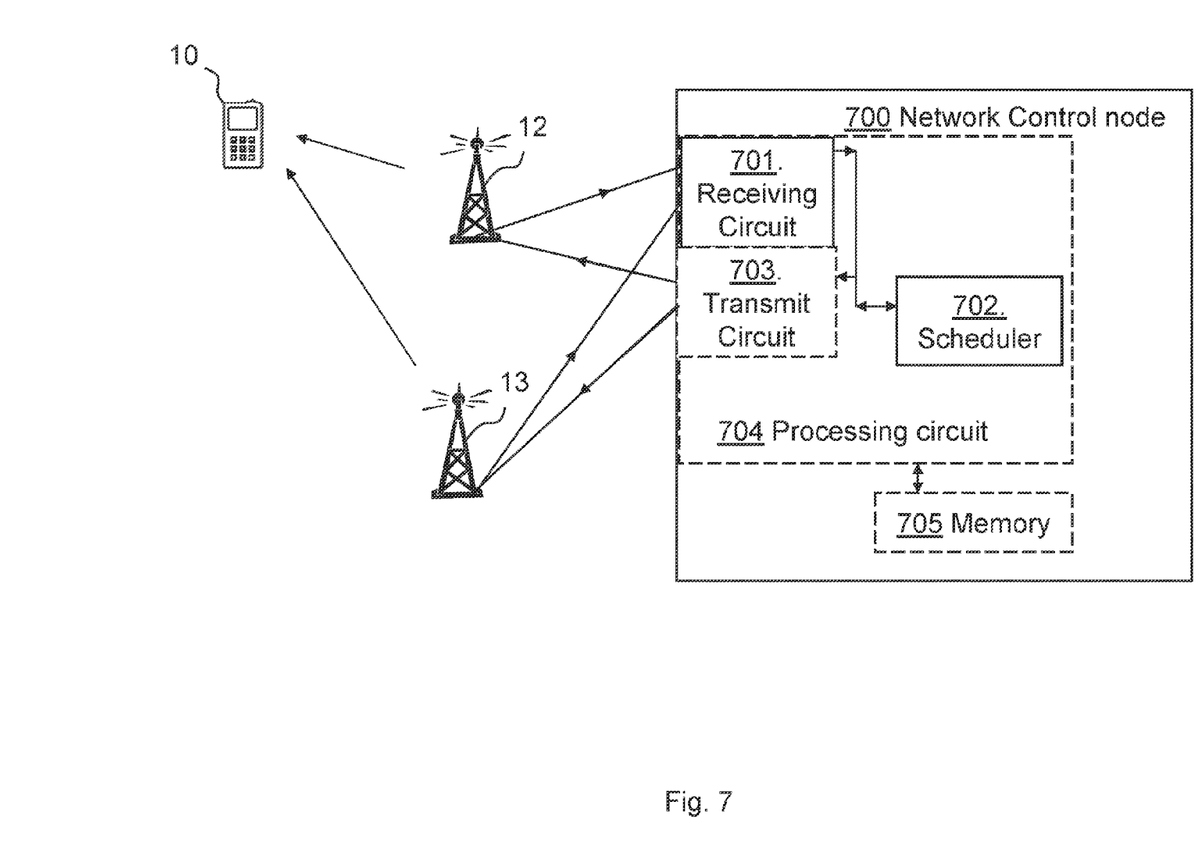
FIG. 7 is a block diagram depicting embodiments of a network control node.

FIG. 7 is block diagram depicting a network control node 700, exemplified above as the RNC 14, for distributing a data packet or data packets towards the user equipment via the first radio network node or the second network node e.g. in a radio communications network. Circuits and units marked with dashed lines are comprised in some of the embodiments of the network control node 700.

The network control node 700 comprises a receiving circuit 701 configured to receive the indication indicating a congestion or not a congestion of MAC-hs or MAC-ehs packets at the first radio network node or the second radio network node; in other words, that the connection to the user equipment 10 is congested or not of MAC-hs or MAC-ehs packets from the radio network node 500. This may be received from the respective radio network node. The indication may comprise the bit indicating congestion or not congestion of MAC-hs or MAC-ehs packets. The indication may comprise the first value indicating no congestion of MAC-hs or MAC-ehs packets or the second value indicating congestion of MAC-hs or MAC-ehs packets. The indication may comprise the value indicating congestion of MAC-hs or MAC-ehs packets due to build-up buffer or the different value indicating congestion of MAC-hs or MAC-ehs packets due to frame drop. The indication may further indicate by itself or in another field a delay over the Iub interface. The indication may be comprised in the CA CF. The indication may be comprised in a spare extension field in the CA CF. The receiving circuit 701 may be configured to receive information of queue length of MAC-hs or MAC-ehs packets and/or queue delay of MAC-hs or MAC-ehs packets at the first radio network node or the second radio network node. The receiving circuit 701 may further be configured to receive an additional indication indicating that the transport network the first or the second radio network node 12,13 and the network control node 700 is congested or a delay over the Iub interface.

The network control node 700 further comprises a scheduler 702, or a distributor, configured to distribute the data packet to the first radio network node or the second radio network node, that is, to the user equipment 10 via the radio network node 500 and/or another radio network node, taking into account the received indication. The distributor 702 may be configured to distribute data packets according to an algorithm, which algorithm takes the received indication into account. The scheduler 702 may be configured to take the additional indication into account. The scheduler 702 may be configured to schedule packets according to a weight distribution algorithm taking the indication and/or the additional indication into account.

The packets may be distributed to a number of radio network nodes via a transmitting circuit 703.

The embodiments herein for distributing the data packet may be implemented through one or more processors, such as a processing circuit 704 in the network control node 700 depicted in FIG. 7, together with computer program code for performing the functions and/or method actions of the embodiments herein. The program code mentioned above may also be provided as a computer program product, for instance in the form of a data carrier carrying computer program code for performing embodiments herein when being loaded into the network control node 700. One such carrier may be in the form of a CD ROM disc. It is however feasible with other data carriers such as a memory stick. The computer program code may furthermore be provided as pure program code on a server and downloaded to the network control node 700. The network control node 700 further comprises a memory 705 that may comprise one or more memory units and may be used to store for example data such as scheduling algorithms, congestion information, application to perform the methods herein when being executed on the network control node 700 or similar.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Modifications and other embodiments of the disclosed example(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a radio network node for informing a network control node about a state of a connection between the radio network node and a user equipment served by the radio network node, the method comprising:
   determining whether congestion over a radio interface towards the user equipment exists or not, wherein the congestion is determined to exist when Medium Access Control-high speed, MAC-hs, or Medium Access Control-enhanced high speed, MAC-ehs, packets congest a radio bearer towards the user equipment; and
   transmitting to the network control node an indication indicating whether or not there is congestion of the MAC-hs or the MAC-ehs packets in the radio bearer towards the user equipment,
   wherein the determining comprises to determine whether a delay of transmitting Hybrid Automatic Repeat Request, HARQ, messages is over a threshold.

2. The method according to claim 1, wherein the determining further comprises to determine that a transport network between the radio network node and the network control node is congested based on received Delay Reference Time from the network control node.

3. The method according to claim 1, wherein the indication further indicates a delay over an Iub interface.

4. The method according to claim 1, wherein the indication comprises a bit indicating congestion of the MAC-hs or MAC-ehs packets.

5. The method according to claim 1, wherein the indication comprises a first value indicating no congestion of the MAC-hs or MAC-ehs packets or a second value indicating congestion of the MAC-hs or MAC-ehs packets.

6. The method according to claim 1, wherein the indication comprises a value indicating congestion of the MAC-hs or MAC-ehs packets due to a build-up buffer or a different value indicating congestion of the MAC-hs or MAC-ehs packets due to frame drop.

7. The method according to claim 1, wherein the indication is included in a spare extension field in a Capacity Allocation Control Frame.

8. The method according to claim 1, wherein the transmitting comprises transmitting at least one of: a queue length of the MAC-hs or MAC-ehs packets; and a queue delay of the MAC-hs or MAC-ehs packets.

9. The method according to claim 1, wherein the transmitting further comprises transmitting an additional indication, to indicate congestion of a transport network between the radio network node and the network control node.

10. A radio network node for informing a network control node about a state of a connection between the radio network node and a user equipment served by the radio network node, said radio network node comprising:
a determining circuit configured to determine whether congestion over a radio interface towards the user equipment exists or not, wherein the congestion is determined to exist when Medium Access Control-high speed, MAC-hs, or Medium Access Control-enhanced high speed, MAC-ehs, packets congest a radio bearer towards the user equipment; and
a transmitting circuit configured to transmit to the network control node, an indication indicating whether or not there is congestion of the MAC-hs or the MAC-ehs packets in the radio bearer towards the user equipment,
wherein the determining circuit is configured to determine whether a delay of transmitting Hybrid Automatic Repeat Request, HARQ, messages is over a threshold.

11. The radio network node according to claim 10, wherein the indication further indicates a delay over an Tub interface.

12. The radio network node according to claim 10, wherein the indication comprises a bit indicating whether or not there is congestion of the MAC-hs or MAC-ehs packets.

13. The radio network node according to claim 10, wherein the indication comprises a first value indicating no congestion of the MAC-hs or MAC-ehs packets or a second value indicating congestion of the MAC-hs or MAC-ehs packets.

14. The radio network node according to claim 10, wherein the indication comprises a value indicating congestion of the MAC-hs or MAC-ehs packets due to a build-up buffer or a different value indicating congestion of the MAC-hs or MAC-ehs packets due to frame drop.

15. The radio network node according to claim 10, wherein the indication is included in a spare extension field in a Capacity Allocation Control Frame.

16. The radio network node according to claim 10, wherein the transmitting circuit is configured to transmit at least one of a queue length of the MAC-hs or MAC-ehs packets and a queue delay of the MAC-hs or MAC-ehs packets.

17. The radio network node according to claim 10, wherein the transmitting circuit is further configured to transmit an additional indication, indicating that a transport network between the radio network node and the network control node is congested.

18. The radio network node according to claim 10, wherein the determining circuit is further configured to determine that a transport network between the radio network node and the network control node is congested, based on a received Delay Reference Time from the network control node.

19. The method according to claim 1, wherein a bitmask is included in a spare extension part of a Capacity Allocation Control Frame to indicate whether information is present for at least one of: MAC-hs queue length, MAC-hs queue delay, or Tub dynamic delay.

20. The radio network node according to claim 10, wherein a bitmask is included in a spare extension part of a Capacity Allocation Control Frame to indicate whether information is present for at least one of: MAC-hs queue length, MAC-hs queue delay, or Tub dynamic delay.

* * * * *